(12) United States Patent
Masaro et al.

(10) Patent No.: US 7,588,632 B2
(45) Date of Patent: Sep. 15, 2009

(54) BIODEGRADABLE FLEXOGRAPHIC INK

(75) Inventors: Laurent Masaro, Montreal (CA);
Patrick Lapointe, Montreal-Nord (CA);
Jean-Charles Jacques Gayet, Montreal (CA)

(73) Assignee: BioMatera inc. (CA)

( * ) Notice: Subject to any disclaimer, the term of this patent is extended or adjusted under 35 U.S.C. 154(b) by 85 days.

(21) Appl. No.: 10/500,856

(22) PCT Filed: Jan. 23, 2003

(86) PCT No.: PCT/CA03/00088

§ 371 (c)(1),
(2), (4) Date: May 24, 2005

(87) PCT Pub. No.: WO03/062334

PCT Pub. Date: Jul. 31, 2003

(65) Prior Publication Data

US 2005/0215662 A1    Sep. 29, 2005

Related U.S. Application Data

(60) Provisional application No. 60/350,347, filed on Jan. 24, 2002.

(51) Int. Cl.
*C09D 11/02* (2006.01)
(52) U.S. Cl. .............. 106/31.58; 106/31.86; 106/31.27; 106/31.6
(58) Field of Classification Search .............. 106/31.27, 106/31.6, 31.58, 31.86
See application file for complete search history.

(56) References Cited

U.S. PATENT DOCUMENTS

| 3,884,707 | A | * | 5/1975 | Dick et al. ............... 106/31.28 |
| 3,995,992 | A | * | 12/1976 | Defago et al. ................. 8/470 |
| 4,163,001 | A | * | 7/1979 | Carumpalos et al. ........ 524/110 |
| 4,657,590 | A | | 4/1987 | Gamblin |
| 4,686,260 | A | * | 8/1987 | Lindemann et al. ......... 524/458 |
| 4,704,163 | A | | 11/1987 | Baratto et al. |
| 4,883,714 | A | * | 11/1989 | Stockl et al. ............. 428/195.1 |
| 5,004,664 | A | | 4/1991 | Fuller et al. |
| 5,084,492 | A | * | 1/1992 | Pinell et al. ................. 523/161 |
| 5,114,479 | A | | 5/1992 | Keaveney et al. |
| 5,120,360 | A | | 6/1992 | Tajiri et al. |
| 5,534,049 | A | | 7/1996 | Wallstrom et al. |
| 5,713,991 | A | | 2/1998 | Kimura |
| 5,830,927 | A | | 11/1998 | Vanderhoff et al. |

FOREIGN PATENT DOCUMENTS

| CA | 2018954 | | 6/1990 |
| DE | 4 117 127 | | 5/1991 |
| EP | 4 465 64 | | 9/1991 |
| JP | 08092518 | | 4/1996 |
| JP | 08319445 | | 12/1996 |
| JP | 2001-294792 | | 10/2001 |
| JP | 2001294792 A | * | 10/2001 |
| JP | 2001-323052 | | 11/2001 |
| WO | WO 9964498 | | 12/1999 |

OTHER PUBLICATIONS

English Translation of JP 2001-294792.*

* cited by examiner

*Primary Examiner*—Jerry Lorengo
*Assistant Examiner*—Veronica Faison Gee
(74) *Attorney, Agent, or Firm*—Ogilvy Renault, LLP

(57) ABSTRACT

The present invention relates to a flexographic water based ink in which a biodegradable polymer, such a polyhy-droxy-alkanoate (PHA), replaces conventional poorly or non-biodegradable organic polymeric resins for example. PHAs are used as a latex suspension in water, thus the present invention relates to a novel pigment/latex mixture. PHA in a latex form is a fluid vehicle in which all the other components necessary to provide a flexographic ink are added, i.e., pigments, wax and/or binder, as well as a solvent, if necessary. The PHAs are mainly responsible for the biodegradability of the flexographic water based ink. The present invention relates also a method to produce a flexographic water based composition with enhanced biodegradability properties.

12 Claims, No Drawings

BIODEGRADABLE FLEXOGRAPHIC INK

TECHNICAL FIELD

The present invention relates to inks, and more particularly to flexographic water based inks that have enhanced biodegradability properties as a result of their composition.

BACKGROUND ART

Inks which are used in either flexographic printing processes or letterpress printing presses must adhere to any rollers in the ink train, wet the print roller, then must easily and evenly be transferred over to the printed substrate and form a permanent bond thereto.

A letterpress system has a series of rollers to pick up and form a uniform film of ink that is transferred by these rollers to the cylinder carrying the type. A letterpress uses raised types that are mounted on a cylindrical impression roller. The roller in turn is coated with the ink on the raised portions that form the characters and is rotated against the paper or other substrate to be printed. Flexographic presses use an anilox metering roller in conjunction with form rollers or a doctor blade to define a uniform layer of ink that is then transferred to the print cylinder.

Nowadays, flexographic presses and letterpress presses, for newspapers printing, use types made- of photo-sensitive polymeric materials that can be formed directly from a light image. The polymeric cylinder when properly developed presents raised areas that reproduce the image to be printed. This plate is mounted on a cylindrical roll that rotates against an ink cylinder so as to become coated in its raised areas. These areas rotate against a substrate (generally paper) which is backed by a hardened rubber roller.

Letterpress and flexographic systems can be used with either solvent based or aqueous based ink systems. In either case, current practice consists of mixing a solvent or water in the presence of a binder resin such as, for example, nitrocellulose, maleic anhydride, an acrylic copolymer, or various starch derivatives. The pigment is applied over the paper by the printing roller and the binder serves to hold the pigment particles in place. In some instances, the pigment is carbon black directly suspended in a high boiling point aliphatic hydrocarbon solution. This ink has no binder but instead is fixed to the paper by diffusion of the oil into the paper thus leaving a highly blackened layer of carbon black and oil upon the surface of the paper. These oil-based systems suffer from a number of disadvantages including the fact that since the print never chemically bonds to the paper it can easily smudge when handled. Furthermore there is a tendency for the inks to contaminate the various guide rollers in the system and to produce a background.

A water based flexographic ink composition generally comprises a pigment, a polymer resin, a binder or wax, an organic solvent and water. Such compositions vary depending on the characteristics of the raw materials, the quality required, as well as different properties provided by numerous manufacturers. Trends in the last years resulted in a decrease of the content in volatile organic solvent to limit their impact on the environment. Nowadays, water based flexographic inks usually contain between 5 up to 20% of organic solvents. Although they are harmful, they cannot easily be eradicated because they help to reduce the drying time of the ink once it is applied on a surface (paper, cardboard, plastic, etc.). Only few other concrete efforts have been devoted to improve the environmental aspect of flexographic inks. Therefore, they are still composed of poorly or non-biodegradable pigments and polymer resins that generally accumulate in post-treated sludge resulting from the de-inking processes, or are buried in soils when the final product is disposed therein. Biodegradable pigments already exist, but they do not provide better properties than synthetic pigments. Conventional flexographic ink compositions are normally made of acrylic, methacrylic, epoxy or styrene based polymer resins. Actually, acrylic and epoxy resins are present in 90% of the flexographic ink compositions.

U.S. Pat. No. 5,004,664 describes a toner composition comprising semicrystalline polyester resin particles, polyhydroxyalkanoates and copolymers thereof and pigment particles. This application is suitable for electrostatic printing only.

U.S. Pat. No. 5,114,479 describes the use of a fortified latex. suspension as a vehicle to make dye/latex mixtures for gravure and flexographic inks for newsprint and corrugated applications. They used water-soluble polymers based on acrylic and methacrylic acids.

Tajiri et al. report in U.S. Pat. No. 5,120,360 the use of microcapsules containing ink for flexographic applications. The authors describe that encapsulation of the ink ensures a better adhesion and flowability. Resins used for the microencapsulation are composed of methacrylate or acrylate of molecular weight of 3,000 up to 50,000 g/mol. Vanderhoff and Huwart report in U.S. Pat. No. 5,830,927 an ink composition devoid of volatile organic solvent and containing a water-soluble polymer such as polyvinyl pyrrolidone, polyacrylamide, polyacrylic acid, polyvinyl acetate, polyvinyl alcohol and the likes.

Takashi et al. report in Japan Patent No. 8092518 a biodegradable ink composition based on polylactic acid, without the use of any organic halogenous solvent.

Based on the above-listed patents and publications, which are representative of the state of the art, there is still a large place for improvement in producing a flexographic water based ink composition which induces enhanced environmental properties.

DISCLOSURE OF INVENTION

One object of the present invention is to provide a flexographic ink composition comprising a biodegradable polymer, a binder, and a solvent. Another object of the present invention is to provide a method to produce inks, having the above composition.

The flexographic ink composition may further comprise a dye or a pigment which can be at concentration between about 1 to 40% (w/v) or in an amount effective to provide a visible mark on a substrate.

Another to the present invention the polymer may be a synthetic or a natural polymer, and may be selected from the group consisting of polyhydroxyalkanoate (PHA), polylactic acid (PLA), poly(lactic-co-glycolic) acid (PLGA), polyglycolic acid (PGA), polycaprolactone (PCL), polyvinyl alcohol (PVA), a polymer derived from adipic acid or aminocaproic acid, poly(butylene succinate), or a derivative or a mixture thereof.

The binder may be an amphiphilic compound which is biodegradable, and the solvent may comprise water or an organic solvent, such as alcohol.

The biodegradable polymer is preferably at a concentration between about 20 to 80% (w/v), the binder is preferably at a concentration between about 0 to 20% (w/v), and the solvent is preferably at a concentration between about 1 to 25%.

The dye may be a water-soluble dye, a basic or an acid dye.

The present invention also relates to a method for producing a flexographic water based ink composition including a biodegradable resin such as PHAs.

Another object of the present invention is to enhance the biodegradability properties of a flexographic water based ink composition by using biodegradable compounds.

For the purpose of the present invention the following terms are defined below.

The term "biopolymer" as used herein is intended to mean polymers obtained from natural or renewable sources for which the mode of synthesis occurs naturally such as in plants or microorganisms. PHAs are good examples according to this definition.

The term "polymer" as used herein is intended to mean is macromolecules synthesized by chemical reaction or obtained from petroleum sources, even if one of the components (monomer, precursor, etc.) is obtained from natural and renewable sources. Polylactic acid (PLA), polyglycolic acid (PGA), poly(lactic-co-glycolic) acid (PLGA), polyvinyl alcohol (PVA) and polycaprolactone (PCL) are all considered as polymers according to the present invention.

The term "binder" as used herein is intended to mean an amphiphilic chemical compound having both hydrophobic and hydrophilic. Due to this particular structure, the binders are capable of association with polymer granules, like PHA and PLA, or other hydrophobic insoluble compounds such as pigments.

The term "pigment" as used herein is intended to mean a colorant based on inorganic or organic particles which does not dissolve in water or solvents. Usually they form an emulsion or a suspension in water.

The term "dye" as used herein is intended to mean a colorant from natural or synthetic origin that is soluble in water or solvents.

The term "biodegradable" as used herein is intended to mean properties of a polymer or a biopolymer when subjected to chemical or enzymatic hydrolysis, resulting in a decrease of their molecular weight, i.e., they break down into smaller sub-units which are non hazardous for the environment. Further, these smaller sub-units are absorbed by the microorganisms and used as energy source, such as for PHAs. Thus at the end of their life cycle, PHAs are transformed into water and carbon dioxide. The term "biodegradable" as used herein is also intended to mean properties of chemical entities other than polymers or biopolymers that are is subjected to absorption by a bacteria in which they are metabolized.

The terms "granule" or "particle" as used herein are intended to mean spheroids shaped polymer segments with particle size distribution between 0.01 and 10 µm, preferably between 0.1 and 5 µm. The terms "granule" and "particle" as used herein are also intended to mean pigments with particle size distribution between 0.01 and 20 µm, preferably between 0.1 and 10 µm.

The term "latex" as used herein is intended to mean a suspension of PHA granules and/or particles in an aqueous medium. The PHA granules can be either in their native state or resuspended in water. Native PHA is defined as a granule of PHA, produced by bacterial fermentation, which was never precipitated, therefore its crystallization degree remains close to or slightly higher than what it was in the bacteria, i.e., very weak.

The latex may have the aspect of milk in color and texture, while the viscosity may be similar to water.

MODES OF CARRYING OUT THE INVENTION

The present invention now will be described more fully hereinafter. This invention, may, however, be embodied in many different forms and should not be construed as limited to the embodiments set forth herein; rather, these embodiments are provided so that this disclosure will be thorough and complete, and will fully convey the scope of the invention to those skilled in the art.

In accordance with the present invention, there is provided a flexographic water based ink and a method for producing a flexographic ink based on a solvent such as water and biodegradable polymer resins.

In accordance with the present invention, there is provided a flexographic water based ink which includes a biodegradable polymer resin.

The Applicants have discovered that PHAs in a latex form are suitable raw materials or polymer resins that can be used for flexographic water based ink applications. Further, the Applicants have discovered a method to prepare flexographic water based ink compositions including biodegradable PHAs resins. A PHA latex in which a pigment and a binder are added forms a stable composition in water.

Ink compositions in which poorly or non-biodegradable organic polymer resins are replaced by biodegradable polymers, such as polyhydroxyalkanoates (PHAs) lead to a final product that offers enhanced biodegradability characteristics with physico-chemical properties similar to current commercial products.

Polyhydroxyalkanoates (PHAs) are natural biopolymers that have received, over the last decades, and keep receiving increasing interest among the scientific community and industry. PHAs have captured such attention because of their biodegradability properties. In fact, among the large quantities of polymers and biopolymers available today, PHAs belong to the restricted class of entirely biodegradable polymers. When placed in compost sites, buried in soils or sank in a marine environment, PHAs degrade up to 100%. However, no degradation occurs while the product is maintained in the surrounding atmosphere as well as when exposed to sun radiation, i.e., during its usefull life. Products made of PHAs keep their physico-chemical as well as mechanical properties until they are placed in a condition to be degraded.

PHAs are polyesters produced and accumulated by microorganisms such as bacteria and algae. PHA is present intracellularly in the form of granules. These granules act as carbon energy storage and are biosynthesized in adverse conditions when an essential nutrient such as nitrogen, oxygen or phosphorous is limited. Under such conditions, bacteria can no longer grow or proliferate and switch their metabolism to the production of PHB in order to have a usable carbon source when conditions return back to normal. Therefore, a feeding strategy becomes a critical step that will have a direct impact on the yield of production of the biopolymer. Feeding source is also an important factor that will dictate the nature of the biopolymer produced. In fact, different homo- or copolymers can be obtained by varying the feeding source provided to the microorganism during fermentation. The most well-known representatives of the PHA family are poly(3-hydroxybutyrate) (PHB) as well as its copolymer poly(3-hydroxybutyrate-co-3-hydroxyvalerate)(PHBV).

As mentioned earlier, PHAs main characteristic which readily distinguishes them from chemically synthesized and petrochemical derived polymers, is their propensity to degrade naturally and entirely when placed in compost sites, soils or marine sediments. Most of solid storage sites are populated with microorganisms that secrete enzymes that break down the biopolymer into monomers units. The monomer is then used as carbon source to promote growth of the microorganism.

Another useful aspect of PHAs is their good processability with conventional equipment to produce thermoplastic products like any other polymer or resin. For example, PHAs can be processed into films, sheets, fibers, foams, molded articles and many other products. As a result of these facts PHAs constitute very attractive biopolymers which have received much attention and interest in the last decades. Industrial applications of PHA include shampoo bottles, coated board, drinking cups, water denitrification filter balls, and biodegradable commercial credit cards. Other applications identified in prior art publications are in the field of food packaging, coating, plastic food service items, paint and food additives.

In one embodiment of the present invention, the binder is a triblock compound that has both hydrophilic and hydrophobic properties. At least one triblock compound having both hydrophilic and hydrophobic properties may be added to the latex solution with a pigment. This solution is slightly heated in order to dissolve the binder and homogeneously mix all the constituents. The resulting solution is a flexographic water based ink composition that is very stable in time.

In one other embodiment of the present invention, flexographic water based inks prepared from native PHA biopolymer latex solutions including the addition of a triblock compound, have more uniformity, stability in time and are less subject to sedimentation.

The biodegradable polymer may comprise a polyhydroxyalkanoate, a polylactic acid, a polyglycolic acid, a polycaprolactone, a polyvinyl alcohol, a polyvinyl pyrrolidone or copolymers thereof.

The invention is applicable to create biodegradable resins for flexographic water based ink compositions from any type of PHA biopolymers produced by plants or microbial organisms either naturally or through genetic engineering, as well as chemically synthesized PHA polymers.

The PHA biopolymers may include polyesters composed of monomer units having the formula:

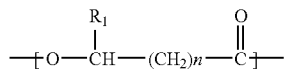

wherein n is an integer from 1 up to 5; $R_1$ is preferably H, alkyl or alkenyl. The alkyl and alkenyl side chains are preferably from $C_1$ up to $C_{20}$. PHA biopolymers can be homopolymers, with the same repeating monomer unit, and/or copolymers with at least two different repeating monomer units. The copolymers can be random, block, alternating or graft. The molecular weights of the PHA biopolymers are in the range of 500 to 5,000,000 g/mol, preferably between 1,000 and 2,500,000 g/mol, and more preferably between 2,500 and 1,000,000 g/mol. Orientation of the monomers can be head to head, head to tail or tail to tail.

PHAs that can be used according to this invention may include poly(3-hydroxybutyrate), poly(3-hydroxyvalerate), poly(3-hydroxyheptanoate), poly(3-hydroxyoctanoate), poly(4-hydroxybutyrate), medium chain length polyhydroxyalkanoates, poly(3-hydroxybutyrate-co-3-hydroxyvalerate), poly(3-hydroxybutyrate-co-4-hydroxybutyrate) and poly(3-hydroxybutyrate-co-3-hydroxyoctanoate) and other copolymer thereof. Copolymers of PHA, listed herein, normally include 40 to 100% of 3-hydroxybutyrate monomer and preferably between 60 to 98%.

According to this invention, the PHA concentration in the latex solution is from 1 up to 50%, preferably from 5 up to 45% and more preferably from 10 up to 40%. Concentrations are expressed in weight/volume. The latex can be obtained from a native biopolyner or from a resuspended dry powder. The origin of the biopolymer can also be extended to those that are crystalline and are reconverted to amorphous state by methods such as the one described in International Patent Publication WO9964498, which is incorporated herein by reference.

According to the invention in its first aspect mixing and heating of a PHA latex, binder and pigment is characterized by obtaining a flexographic water based ink composition including a biodegradable polymer resin. This flexographic water based ink remains stable in time and does not sediment. Such behavior can be explained by the fact that the hydrophobic end terminal parts of the binder link the hydrophobic granules or particles present in the medium, such as PHA and pigment, whereas the hydrophilic core of the binder provides the content and stability of the aqueous domain. The resulting product looks like a cream, i.e., it has an increased viscosity, sedimentation or stability in time, when compared to the initial individual products.

The use of a biodegradable resin induces an enhanced biodegradable flexographic water based ink which will result in lower hazardous impact on the environment once the final product will be placed in a compost site or will lead to less toxic sludge resulting from de-inking processes.

One structure of the triblock chemical compound corresponds to two hydrophobic end domains and one core hydrophilic domain. It is assumed that the hydrophobic end domains are easily associated through hydrophobic-hydrophobic weak interactions with the hydrophobic PHA polymeric chains present in the medium. Similar interactions can be assumed with the pigment. A similar phenomenon is assumed with triblock compounds having one hydrophobic core and two hydrophilic end parts. In addition, a similar phenomenon is assumed with amphiphilic compounds, i.e., diblock having hydrophilic and hydrophobic properties. However, it is assumed that such systems will provide less stability in time and a less extended sedimentation time.

A hydrophobic domain may comprise for example linear and/or branched aliphatic chains $C_nH_{2n+2}$ ranging form $C_1$ to $C_{40}$. In the case of a triblock sample with a hydrophobic domain at both ends, only one has to be long enough to interact with PHA chains or pigment particles, the other one can be shorter. Linear and/or branched unsaturated alkyl chains ranging from $C_2$ to $C_{40}$, with one or more unsaturation, including one or more aromatic moieties are also considered.

A hydrophobic domain may contain one or more heteroatoms (nitrogen, oxygen, sulfur, chlorine, fluorine, etc.), single or mixed. For example, poly (propylene glycol) is a hydrophobic compound with an oxygen heteroatom in the main polymeric chain and a branched alkyl group, namely a methyl group.

A hydrophobic domain can for example consist of saturated fatty acids with an alkyl chain from $C_{10}$ up to $C_{30}$, preferably between $C_{14}$ and $C_{24}$, for example, lauric, myristic, palmitic, stearic, arachidic, behenic, lignoceric acid. A hydrophobic domain can also be an unsaturated fatty acid, having one or more unsaturated alkyl chain from $C_{10}$ up to $C_{30}$, preferably between $C_{14}$ and $C_{24}$, for example, palmitoleic, oleic, linoleic, α-linolenic, γ-linolenique, arachidonic, eicosapentaenoic, and nervonic acid. Triblock compounds are made of one or two fatty acids at their ends.

A hydrophilic domain may for example comprise non ionic chemical entities such as polyalkylene oxide, especially polyethyleneoxide, glycoside, or polyglycerol or amine oxide. A hydrophilic domain may comprise ionic entities such as carboxylate, sulfate, sulfonate, phosphate, phosphanate or ammonium. The hydrophilic group of the triblock compound may contain more than one chemical compounds from the list above mentioned. The most suitable hydrophilic domain is poly(ethylene glycol) and derivatives thereof of formula

$$HO-(CH_2-CH_2-O)_n-H$$

where n is an integer varying from 1 up to 2,500, preferably between 3 to 500.

The hydrophilic domain may also be a hydrophilic polymer or biopolymer, such as polyvinyl alcohol, polyvinyl acetate, polyepichlorohydrin, polyacrylates and derivatives thereof as well as cellulose and its derivatives (polysaccharides).

The quantity as well as the chemical structure of the triblock compounds added to the biopolymer or polymer to obtain the flexographic water based ink composition will influence the viscosity of the final composition. In fact, several parameters of the triblock compound can be adjusted, such as quantity of triblock compounds versus biopolymer or polymer and pigment, global molecular weight of the triblock compound, length of the hydrophilic block, length of each hydrophobic block. Others parameters can be modified to reach the desired viscosity and of the final product properties. Namely but not exclusively, they are the molecular weight of the polymer resin, and the quantity and chemical nature of the pigment or dye. By adjusting some or all of these parameters, the characteristics of the final composition can be adjusted In fact, a small quantity of triblock compound may not induce sufficient hydrophobic-hydrophobic interactions to extend the sedimentation time of the biopolymer and pigment. When the molecular weight of the polymer resin is reduced to a certain level, an acceptable stability can be obtained and the addition of a binder may become optional.

According to the present invention, the concentration of the binder may be between 0 up to 20%, preferably between 0.5 up to 15% and more preferably between 1 up to 10%. Concentrations are expressed in weight/volume. The binder can be used alone or as a mixture, at least 2 up to several tens or so, with the same or different concentration. The nature of the binder added can also vary. For example a triblock compound with a short chain and another with a long chain. In addition, one or several amphiphilic compounds can be added with one or several triblock compounds.

According to the invention, the use of a biodegradable binder in addition to the biodegradable polymer induces a more enhanced biodegradable flexographic water based ink which will result in lower hazardous impact on the environment once the final product will be placed in a compost site or will lead to even lesser toxic sludge resulting from de-inking processes.

Pigments are the second major component in the flexographic water based ink composition. All pigments available are suitable according to this invention, whether they are in the form of powder or paste. The molecular weight of the pigment as well as its charge (cationic, anionic or neutral) does not alter the result of this invention.

According to the present invention, the concentration of the pigment is preferably between 1 up to 40%, preferably between 2.5 up to 35% and more preferably between 5 up to 30%. Concentrations are expressed in weight/volume.

The pigment can be substituted by a dye, with the same range of concentrations. Similarly to the pigments, numerous dyes do exist, and they are all suitable for this invention.

According to the invention, the use of a biodegradable pigment or dye, in addition to the biodegradable polymer and binder induces a more enhanced biodegradable flexographic water based ink which will result in lower hazardous impact on the environment once the final product will be placed in a compost site or will lead to even lesser toxic sludge resulting from de-inking processes.

Volatile organic solvents suitable for this invention include all organic solvents, miscible with water, having boiling point lower than 100° C., or solvents and will induce an azeotropic mixture with water that will lower its boiling temperature. Preferred volatile organic solvents belong to the alcohol family, such as isopropyl alcohol.

According to the present invention, the concentration of the volatile organic solvent is preferably between 0 up to 25%, more preferably between 1 up to 20% and still more preferably between 2 up to 15%. Concentrations are expressed in volume/volume.

According to the present invention, water may complete the rest of the solution. The concentration of water may be between 20 up to 80%, preferably between 30 and 70% and more preferably between 40 and 60%. Concentrations are expressed in volume/volume.

In one embodiment of the present invention, the solutions are heated in order to dissolve the binder and to homogenize all the constituents. Heating temperature is between 25 and 80° C., preferably between 27.5 and 75° C., and more preferably between 30 and 70°0 C.

Contrary to the aqueous flexographic printing inks disclosed in the prior art, adhesion of the water-soluble dye to the substrate is not obtained by converting the water-soluble dye into a water-insoluble reaction product, e.g. by reaction with a carefully selected binder or resin. It is believed that adhesion of the water-soluble dye in the flexographic printing ink according to the present invention is essentially obtained by penetration into the substrate along with the resin and the binder. An excellent fixation to the substrate is secured partly by coating and protection of the dye with both the binder and the resin, and also partly by the hydrophobic character of the print achieved through the presence of a wax component.

According to one embodiment of the present invention, a softening or thickening agent can be added to the flexographic ink.

The softening or thicking agents used in the flexographic ink according to the present invention may comprise glycols and in particular glycol derivatives, such as glycol ethers and esters, and aromatic esters.

The thickening or rheology modifying agents used in the flexographic ink according to the present invention may comprise inorganic substances, such as china clay and colloided silica, as well as organic substances, such as aqueous dispersions of high polymeric acrylic polymers and cellulose derivatives.

Further additives may include surfactants and dispersing agents.

Since the choice of dyestuff may be made virtually freely, i.e. notwithstanding the choice of binder, flexographic printing inks exhibiting all possible shades of color may be easily achieved, even if the dyestuff components used in the printing ink is selected exclusively from the group of environmentally acceptable dyestuffs.

When the ink formulation comprises a pigment, it is convenient to add a dispersing agent selected from a cationic, anionic and preferably a nonionic dispersing agent. Such dispersion agents are often present in the commercially available pigment.

The flexographic printing ink formulation may be prepared in a concentrated form that is later diluted with water before being used in the printing process. The flexographic printing ink according to the invention can be distributed as a concentrate comprising a solvent essentially consisting of water, a dye or pigment, a binder, additives and a comprising the biodegradable polymer latex dispersed in water.

According to yet another aspect of the invention, printing of a substrate by the flexographic printing process may be achieved by applying the flexographic ink described above to the substrate and subjecting the applied ink to conditions sufficient to fix the print, if desired, by application of heat.

The flexographic printing inks are particularly suited for printing cellulosic non-woven fabrics, in particular paper and cardboard by the flexographic printing method. In addition, according to the invention, the flexographic printing inks may also be used for printing on non-absorbent substrates, e.g. plastic films.

According to another embodiment of the present invention there are provided substrates having a permanent print thereon which is derived from the flexographic printing inks according to the present invention.

Additives for ink vehicles are commonly selected from rosin esters, synthetic film-forming polymers, polyamides, alkyd resins and proteins, including casein, gelatin and soy protein. The choice of additives depends upon the particular substrate used, each type of fibrous or film material having specific requirements for optimum adhesion, as it is known to those of ordinary skill in the art. Further, additives can include wetting or thickening agents to improve the performance of the ink, as it is known to those of ordinary skill in the arts.

Coloring agents or dyes can be organic or inorganic. Representative examples of coloring agents include dyes and pigments. Those of ordinary skill in the art know the choice of suitable coloring agents.

Basic flexographic colors (black, magenta, cyan and yellow) can be obtained from the present invention as well as white and all the panel colors obtained by mixture thereof.

The present invention will be more readily understood by referring to the following examples that are given to illustrate the invention rather than to limit its scope.

EXAMPLE I

Preparation of a PHA Water-based Black Flexographic Ink

Isopropanol (6 mL) is added to water (18 mL) at ambient temperature. Then 5 grams of polyethylene distearate (molecular weight 6,000 g/mol) are added to the solution that is shaked until the complete dissolution of the solid material.

This solution is added to 76 mL of a latex solution of PHA (concentration 40% in PHA with molecular weight of 1,000,000 g/mol and polydispersity of 2). A pigment, carbon black (23 grams) is added to this solution with vigorous shaking while the temperature is raised to 40° C. Heating and shaking are continued for a period of 2 hours, then the temperature is returned to ambient.

The resulting solution corresponds to a flexographic ink composition that remains stable in time. No sedimentation was observed after several months of storage.

EXAMPLE II

Preparation of a PHA Water-based Blue Flexographic Ink

The protocol performed in Example I was repeated with a dye, methylene blue (5 grams). The same result is observed in terms of physicochemical and functional characteristics, as well as for stability.

EXAMPLE III

Preparation of a Substitute for an Acrylic Yellow Flexographic Ink 50 mL of water based yellow dispersion acrylic number 486305 is added to 200 mL of a latex solution (23% PHA concentration, molecular weight around 1,000,000 g/mol). The solution is homogenized and heated to 60° C. Once the temperature is stable, 4 grams of poly(ethylene glycol) distearate (molecular weight 6,000 g/mol) is added. The solution is cooled to ambient temperature when all the components form a homogeneous solution.

This solution was applied over kraft and molded papers, with significant results. The printing process appeared to give desired results and confirms that the biopolymer based ink described herein is a good substitute for the flexographic inks available on the market at this time.

EXAMPLE IV

Preparation of a Substitute for an Acrylic Yellow Flexographic Ink

The same solution was prepared as the one described in example III, except that the PHA used had a reduced molecular weight, i.e., smaller than 100,000 g/mol. The results obtained on kraft and molded papers were similar to those obtained in Example III.

EXAMPLE V

Preparation of a Substitute for an Epoxy Yellow Flexographic Ink

The same solution was prepared as the one described in example IV, except that the yellow pigment used was a water based yellow dispersed epoxy ester number 4886317. This sample provided good results when applied on kraft or molded paper.

While the invention has been described in connection with specific embodiments thereof, it will be understood that it is capable of further modifications and this application is intended to cover any variation, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A flexographic ink comprising polyhydroxyalkanoate (PHA), a binder being a triblock amphiphilic molecule, a solvent and a dye or a pigment in an amount effective to provide a visible mark on a substrate, wherein said PHA is at a concentration between about 20 to 80% (w/v), said binder is at concentration between about 0.5 to 20% (w/v), said solvent is at concentration between about 1 to 25%(v/v), and said dye or pigment is at concentration between about 1 to 40% (w/v).

2. The flexographic ink of claim 1, wherein said dye or pigment is biodegradable.

3. The flexographic ink of claim 1, wherein said solvent is water or an organic solvent.

4. The flexographic ink of claim 3, wherein said organic solvent is a hydrophilic organic solvent or an alcohol.

5. The flexographic ink of claim 1, wherein said dye is a water-soluble dye.

6. The flexographic ink of claim 1, wherein said dye is a basic or acid dye.

7. The flexographic ink according to claim 1, which also comprises at least one softening agent, thickening agent, surfactant, dispersing agent or mixtures thereof.

8. A composition comprising a flexographic ink as claimed in claim 1.

9. The flexographic ink of claim 1, wherein said binder is at concentration between about 0.5 to 15% (w/v).

10. The flexographic ink of claim 9, wherein said binder is at concentration between about 1 to 10% (w/v).

11. The flexographic ink of claim 1, wherein said binder is an amphiphilic molecule consisting of two hydrophobic moiety and one hydrophilic moiety.

12. The flexographic ink of claim 11, wherein said binder is polyethylene glycol distearate.

* * * * *

UNITED STATES PATENT AND TRADEMARK OFFICE
CERTIFICATE OF CORRECTION

PATENT NO. : 7,588,632 B2  Page 1 of 1
APPLICATION NO. : 10/500856
DATED : September 15, 2009
INVENTOR(S) : Masaro et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 333 days.

Signed and Sealed this

Twenty-first Day of September, 2010

David J. Kappos
*Director of the United States Patent and Trademark Office*